Dec. 30, 1952          I. L. WILCOX          2,623,681
CONTAINER BODY AND METHOD OF MAKING SAME
Filed Sept. 4, 1948          3 Sheets—Sheet 1

INVENTOR.
ISAAC L. WILCOX
BY Bodell E. Thompson
Attorneys

Dec. 30, 1952        I. L. WILCOX        2,623,681

CONTAINER BODY AND METHOD OF MAKING SAME

Filed Sept. 4, 1948        3 Sheets-Sheet 2

INVENTOR.
ISAAC L. WILCOX
BY Bodell E. Thompson
Attorneys

Dec. 30, 1952      I. L. WILCOX      2,623,681
CONTAINER BODY AND METHOD OF MAKING SAME
Filed Sept. 4, 1948      3 Sheets-Sheet 3
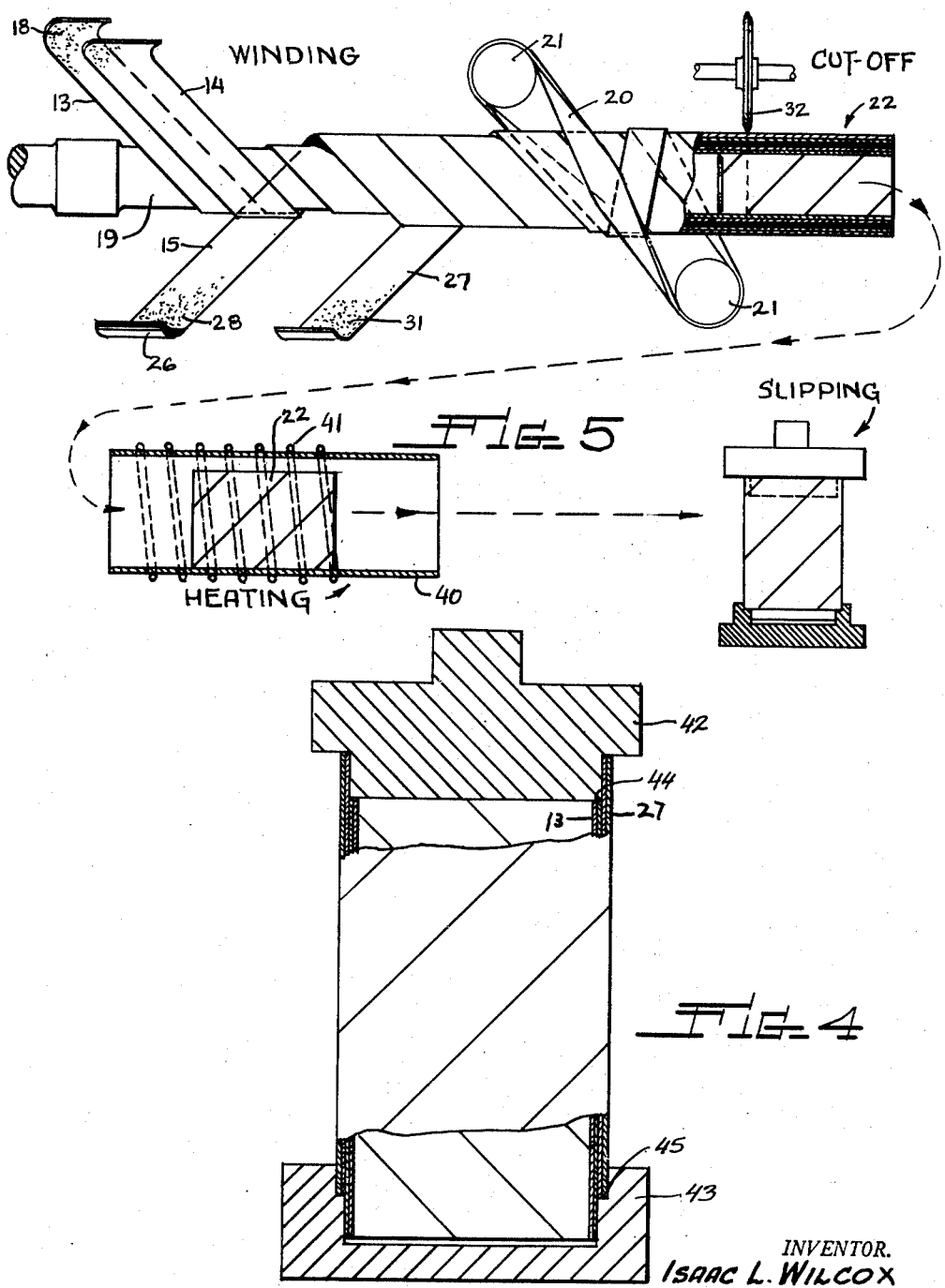
INVENTOR.
ISAAC L. WILCOX Patented Dec. 30, 1952

UNITED STATES PATENT OFFICE 2,623,681

2,623,681

CONTAINER BODY AND METHOD OF MAKING SAME

Isaac L. Wilcox, Fulton, N. Y., assignor to Oswego Falls Corporation, Fulton, N. Y., a corporation of New York Application September 4, 1948, Serial No. 47,924

4 Claims. (Cl. 229—4.5)

This invention relates to bodies for containers formed of paperboard and like materials, and to the method of making such bodies.

The invention has as an object a container body formed of inner and outer layers, each layer consisting of a plurality of plies of sheet material, the plies being rigidly adhered or secured together to form an integral tubular body structure embodying an arrangement however, permitting the inner and outer layers to be shifted axially, whereby the end portions of the body are of less thickness than the remaining portion of the body. This reduction in the thickness of the end portions of the body presents certain advantages in securing one or both of the end closures to the body in making up the container.

The invention has as a further object a container body of the type referred to wherein certain of the plies are or may be formed of impervious sheet material forming a block or barrier to the passage of certain materials, such as oily substances, for which the container may be used as a package.

The invention has as a further object a method of forming such tubular container bodies economically and in large production and without any waste of the sheet material used in forming the container body, and also permitting the use of hot melt adhesives of the type which readily penetrate into, or are readily absorbed by paperboard.

By the method of my invention, these container bodies are formed and the entire container may be assembled without any hand work and on conventional container making machinery.

Heretofore attempts have been made to produce offset tubular paperboard formations. However, none of the methods I am familiar with are practical for the construction of paperboard container bodies, nor are the tubular formations produced thereby. For example, separate tubular formations have been formed, one being of a dimension capable of being telescoped within the other. This requires hand manipulation of the tubes and the very substantial disadvantage of applying adhesive to the tubular formation prior to the telescoping operation if any adhesive is used. Without adhesive, the tubular formations, after being telescoped, would not be suitable for container body use. An attempt has also been made to spiral wind a tubular formation without using any adhesive between the inner and outer layers. In this instance, the outer layer cannot be wound tightly on the inner layer in order to permit subsequent shifting of the layers, and the resulting tubular formation is not of rigid or integral construction and therefore, not suitable for general container use, but it may only be used for mailing tubes and the like.

Container bodies made in accordance with my invention are at normal temperatures rigid and durable to the same extent as spiral wound bodies made by conventional winding methods.

My method consists, generally speaking, in winding inner and outer multi-ply layers of sheet material, such as paperboard. The contiguous plies of said layers however are formed of material non-absorbent to hot melt adhesives of the penetrating type, and such plies are adhered together with that type of adhesive. These plies are adhered to the other plies of the formation, and the other plies to themselves by a suitable heat resistant adhesive. Subsequent to the formation of this tubular arrangement, it is subjected to heat to cause the hot melt adhesive to flow, or become molten, whereupon the inner and outer layers may be shifted axially to obtain the desired offset at the ends of the tubular formation. Thereupon, the hot melt adhesive is permitted to set and again rigidly adhere the inner and outer layers together.

This application is a continuation in part of my application, Serial Number 552,502, filed September 2, 1944, now abandoned.

The invention consists in the novel method and in the combinations and constructions hereinafter set forth and claimed.

In describing this invention, reference is had to the accompanying drawings in which like characters designate corresponding parts in all the views.

Figure 4 is a side elevational view of a container body, partly in section, embodying my invention and illustrating tools suitable for effecting relative axial movement between the inner and outer layers of the body.

Figure 5 is a view illustrating diagrammatically the various steps performed in producing container bodies according to my invention.

Figure 1:
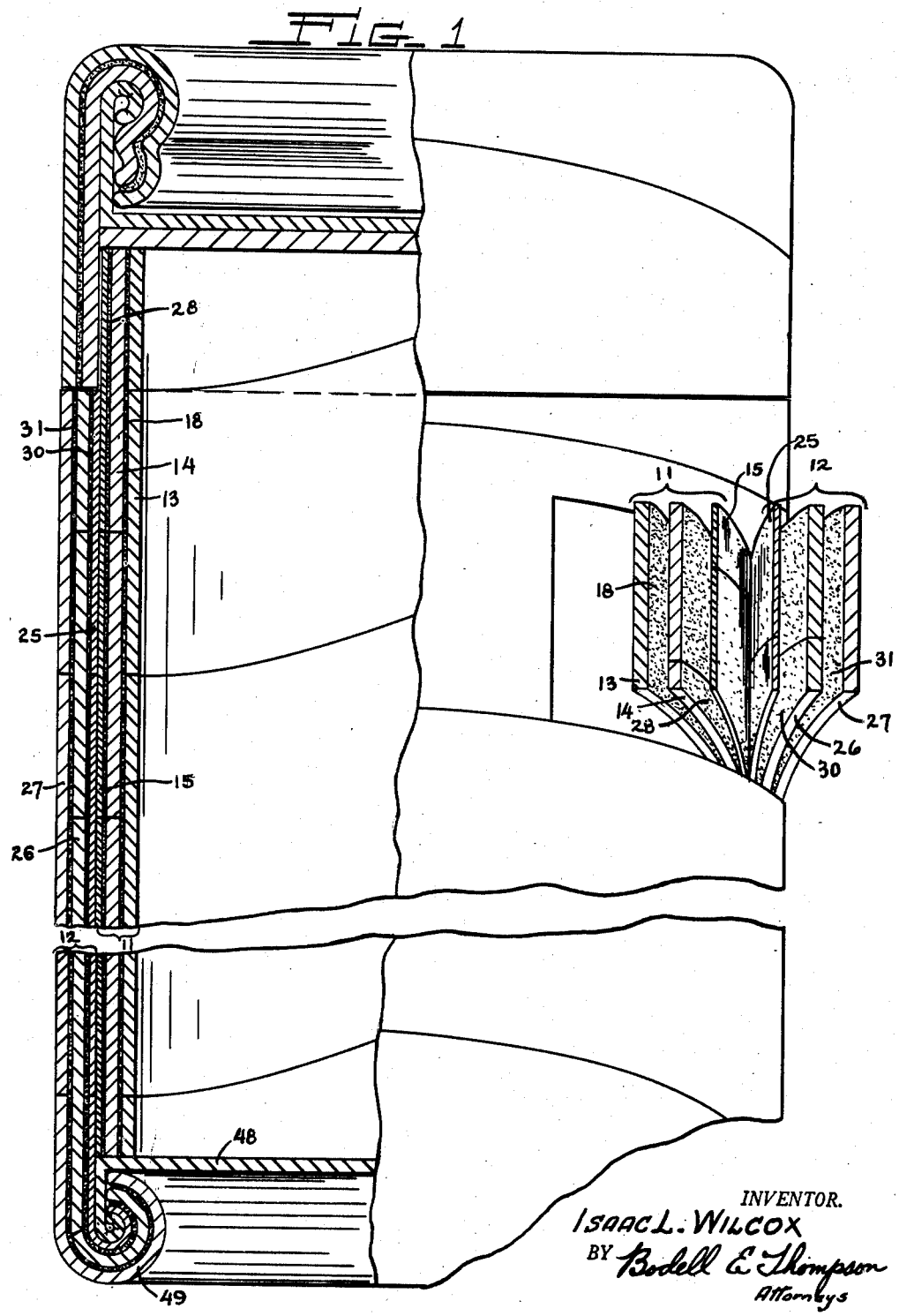
Figure 1 is a side elevational view of a completed container embodying a tubular body structure made in accordance with my invention, parts broken away, and parts in section.

The structure shown in Figure 1 consists of a container body made in accordance with my invention provided with a bottom end closure and a top closure in the form of a slip cover to make a completed container. In this structure, the tubular body of the container consists of inner and outer layers 11, 12. The inner layer 11 is made up of plies 13, 14 and 15. The plies 13, 14, are formed of flexible sheet material, such as paperboard, and these plies are permanently secured together by a suitable adhesive 18. The layers 11, 12, are formed on a conventional tube winding machine shown diagrammatically in Figure 5.

In machines of this type, the various plies used to make up the tubular formation are wrapped about a stationary mandrel 19, the plies being fed onto the mandrel at an angle corresponding to the width of the plies being used and the diameter of the tubular formation being produced. The outermost ply is encircled by a flexible belt member 20 trained over pulleys 21 actuated by power means, one run of the belt being lapped about the tubular formation to effect a half hitch arrangement about the outermost ply of the tubular formation. This belt accordingly serves to continuously wind the plies about the mandrel in a spiral arrangement, whereby the tubular formation is produced continuously off from the free end of the mandrel.

The ply 15 is formed of sheet material impervious or non-absorbent to hot melt adhesives of the type that readily penetrate, or are absorbed, by paperboard.

The outer layer 12 is of similar formation consisting of plies 25, 26 and 27. The plies 26, 27, are similar to the plies 13, 14, of the inner layer, and the ply 25 is similar to the ply 15.

In the winding operation, the plies 13, 14, are permanently secured together by the adhesive 18 which may be of any suitable material which, when set, is resistant to heat. The ply 15 is secured to the ply 14 by a similar adhesive 28. In like manner, the ply 25 is secured to the ply 26, and that ply to the ply 27 by the same type of adhesive. However, the plies 15, 25, are joined by a hot melt adhesive, that is an adhesive which, when subjected to the application of heat, becomes molten, or liquid, and flows readily, as distinguished from thermoplastic adhesives which soften upon the application of heat, but which remain tacky and sticky. Insofar as this invention is concerned, I classify these hot melt adhesives into those which readily and rapidly penetrate, or are absorbed by, paperboard when the adhesive is in the liquid state. A typical example of such an adhesive is paraffin. In the second group, I arrange those which, when in the liquid state, do not penetrate, or which are not readily absorbed by paperboard, but remain on the surface of the board. Examples of this group of adhesives are cellulose acetate butyrate, commercially known as Tenite #2, polyethylene, and polyvinyl acetate mixed with ester gum.

As previously stated, the object of this invention is to produce, in its finished form, a rigid and substantial container body consisting of a plurality of layers of sheet material securely and permanently bound together, but at the same time provided for the relative axial movement between the layers of the body, and with such movement being effected by applying a very slight pressure to the respective layers, thereby avoiding the possibility of deforming, or otherwise injuring the body, or any of the plies or layers thereof. This result is obtained by using the adhesives in the manner set forth above. That is, by securing together the plies making up each layer of the formation with adhesive 18, 28, 30, 31, which, when set, will permanently secure the plies together and which will not melt, soften, or otherwise lose its full adhesive properties upon the application of heat sufficient to render the hot melt adhesive between the plies 15, 25, liquid.

The sheet material employed in the various plies will vary somewhat according to the use the container is intended to be put. It is contemplated that the plies 13, 14, 26, 27, will, in most instances, be formed of paperboard. The innermost ply 13 may be formed of paperboard treated, or coated, in a special manner to make it moisture resistant, or resistant to particular products packaged in the container, or it may be formed of sheet material in and of itself impervious to moisture and liquid, such as moistureproof cellophane, metallic foil, parchment, etc. Likewise, the outermost layer 27 may be formed of treated paper, or may be coated with moisture repellent material, such as lacquer, resins, varnish, etc. However, in the structure of this invention the plies of the layers 11, 12, which are contiguous, that is the innermost plies 15 and 25 are formed of sheet material impervious to hot melt adhesives of the penetrating type, or those which are readily absorbed by paperboard. Materials suitable for these plies are glassine, metallic foil, or synthetically produced films, such as cellophane, acetate, Pliofilm, etc. Such materials are relatively more expensive than paperboard and, in order to economize on the cost, these materials are usually extremely thin, being in the nature of .001 or .002 of an inch in thickness, and the surface of the materials is of a more or less hard slippery nature. Accordingly, it is extremely difficult to properly feed such materials on the mandrel of the tube winding machine as individual webs, this being particularly true where the winding machine is operated at high production speed. In carrying out my method, I laminate the plies 15, 25, onto one of the adjacent plies 14, or 26, one of the plies being permanently joined to the strip 14 or 26 by the heat resistant adhesive 28 or 30, and the other strip being secured by the hot melt adhesive.

In the arrangement shown in Figure 5, I have laminated the plies 15, 25, to the ply 26, the ply 25 being permanently joined to the ply 26 by the adhesive 30, the ply 15 being joined to the ply 25 by the hot melt adhesive. In this manner, the thin plies 15, 25, of the impervious material are conveniently handled inasmuch as they are laminated onto the heavier paperboard ply 26.

The lamination of the plies 15, 25 to the plies 14 or 26 may be accomplished by first laminating the plies 15, 25 together with a hot melt adhesive and then laminating onto the ply 14 or 26. Or one of the plies 15, 25 may be first laminated to one of the plies 14 or 26 and then the second impervious ply laminated onto the first impervious ply. It will be understood that during the winding operation disclosed in Figure 5, the adhesives 18, 28, and 31 are applied to the respective plies during the winding operation, whereby the ply 15 becomes permanently secured to the ply 14.

Figure 2:
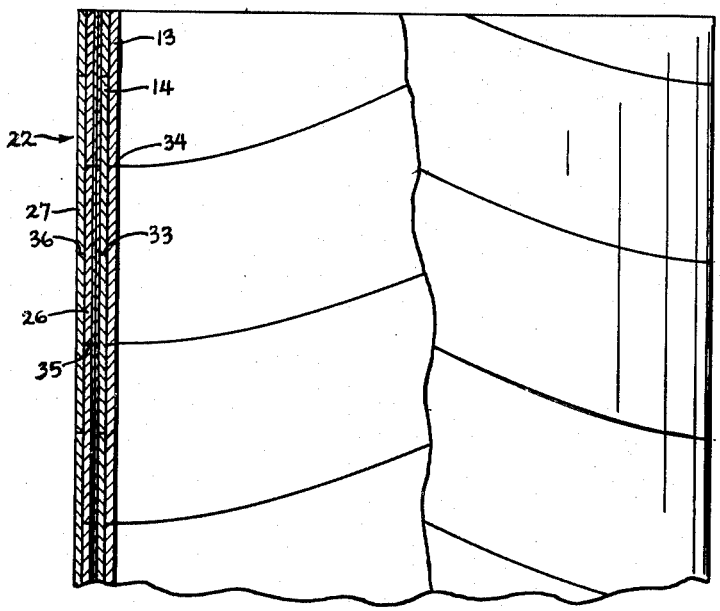
Figure 2 is a vertical sectional view of the container body shown in Figure 1 previous to the shifting of the layers.

The tubular formation 22 is automatically cut to desired length by a cut-off wheel 32 which is part of the tube winding mechanism, as will be well understood by those familiar with this art. The structural arrangement of this severed section of the wound tubular formation is illustrated in Figure 2 of the drawings. It will be noted that the plies 13 and 14 are offset axially to bring the joint of the spiral formation of the ply 14, as indicated at 33, in offset relation to the joint 34 of the inner ply 13. The joint 35 of the ply 26 and of course, the plies 15, 25, is arranged in register with the joint 34 of the inner layer 13, and in like manner the joint 36 of the outer layer 27 is arranged in register with the joint 33 of the layer 14. In other words, the joints of contiguous layers are offset in the manner of the conventional tube winding.

The severed section 22 is subjected to heat. In the production of containers, this may be accomplished by passing the section through a tubular oven 40 maintained at a suitable temperature by heating elements 41. The heated section is then passed to suitable tools, as members 42, 43, illustrated in Figure 4, the lower member 43 being formed with a shoulder 45 engaging the outer layer 12 of the tubular formation, and the tool 42 being formed with a shoulder 44 engaging the inner layer 11 of the tubular formation.

Figure 3:
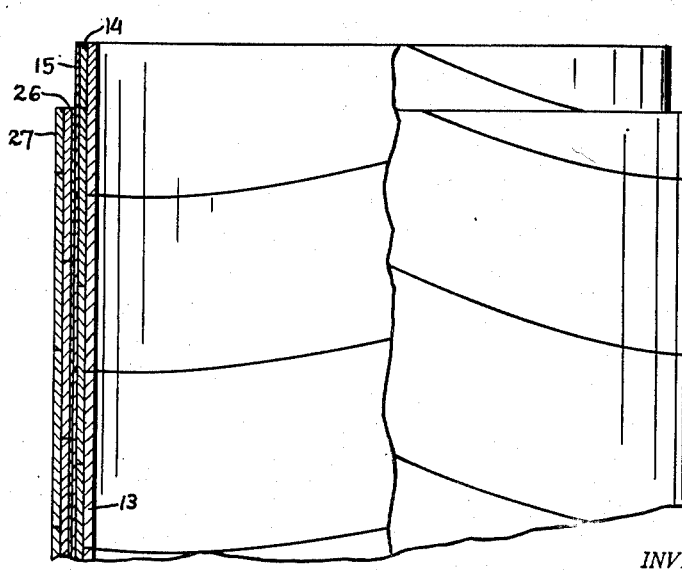
Figure 3 is a view, similar to Figure 2, showing the layers in shifted position.

With this arrangement, movement of the tool 42 towards the member 43 effects axial shifting of the inner layer 11. It will be recalled that in the winding operation, the ply 25 is fixedly adhered to the ply 26, and the ply 15 to the ply 14, the plies 15, 25, however being secured by the hot melt adhesive. Accordingly, in the shifting operation by the tool shown in Figure 4, the ply 15 shifts with the inner layer 11, and the ply 25 shifts with the outer layer 12, as shown in Figure 3. Accordingly, this shifting results in an offset between the joints of the plies 15, 25. This shifting requires an extremely light pressure on the tool 42, due to the fact that the hot melt adhesive is rendered liquid, or molten, by the application of the heat to the tubular formation and due to the impervious surfaces of the plies 15, 25. However, during the winding operation, the plies 15, 25, are wound in close engagement, as are the other plies of the tubular formation. Accordingly, when the hot melt adhesive sets, the tubular body is in the form of a multi-ply rigid mass.

The plies 15, 25, not only serve as a barrier to confine the hot melt adhesive therebetween and prevent the adhesive from penetrating or soaking into the paperboard plies when in the molten state, but these plies also serve as a barrier against the wicking or passage of liquid contents placed in the container of a nature that will penetrate paperboard. These barrier plies 15, 25, are sufficient to accomplish this purpose in connection with the packaging of many products and accordingly, avoids the necessity of using an especially prepared inner ply 13.

The advantages of the offset tubular formation shown in Figure 3 for container body construction will be readily apparent. It provides a substantial shoulder against which to seat the bottom end closure 48, and the projecting outer layer provides a more flexible side wall portion to effect the crimp 49. This phase of the structure has the further advantage in accurately locating the bottom member 48 from the open end of the container, whereby paper containers can be made within very close limits of accuracy of capacity. Also, the engagement of the bottom closure against the inner layer provides a substantially more rigid bottom structure.

The further advantage of the offset relation in regard to the upper or open end of the container permits the use of a slip cover having an annular flange complemental in thickness to the outer layer 12 of the body formation, whereby the cover is flush with the body, as shown in Figure 1, adding to the neatness of the container.

These advantages are not only present in the finished container, but they are obtained without any waste of material and without in any way slowing down present day container production rates. The initial winding operation is conventional, the heating of the severed sections, because of the unique arrangement and combination of the plies 15, 25, and the hot melt adhesive, may be heated sufficient to effect the offset with an extremely short application of heat, and this may be effected during movement of the severed section from the tube winding machine to the container making machine. The axial shifting is effected by simply adding the tools 42, 43, to one station of the conventional container making machine.

What I claim is:

1. The method of making tubular container bodies, the improvement consisting in winding inner and outer multi-ply layers of a sheet material with the contiguous plies of said layers formed of material impervious to liquified hot melt adhesives and joining said contiguous plies with such adhesive, simultaneously joining the remaining plies together and to said contiguous plies with a heat resistant adhesive, cutting said tubular formation into container bodies, subjecting said bodies to heat to render said hot melt adhesive liquid, effecting relative axial movement of said layers while said hot melt adhesive is in liquid condition and thereafter permitting said adhesive to set and secure said layers together.

2. The method of forming tubular container bodies for containers and the like, the improvement consisting in spiral winding inner and outer multi-ply layers of paperboard in tubular formation, simultaneously winding contiguous plies of wax impervious sheet material between said layers, joining the layers of each ply with a heat resistant adhesive and joining said contiguous layers with a wax adhesive, cutting said tubular formation into container body sections, subjecting said sections to heat to liquify said wax adhesive, effecting relative axial movement of said layers while said wax adhesive is in liquid condition and thereafter permitting said wax adhesive to set and secure said shifted layers together.

3. A body section for paperboard containers comprising a tubular member formed of multi-ply layers of spirally wound sheet material, the plies of each layer being joined together by heat resistant adhesive, said layers being joined together by a hot melt wax adhesive, the contiguous plies of said layers being formed of sheet material impervious to said hot melt wax adhesive.

4. A body section for paperboard containers comprising a tubular member formed of spirally wound inner and outer multi-ply layers of sheet material, the plies of each layer being joined together by heat resistant adhesive, said layers being offset axially to produce end portions of reduced thickness, the contiguous plies of said inner and outer layers being joined by a penetrating type hot melt adhesive, said contiguous plies of said layers being formed of sheet material impervious to said hot melt adhesive.

ISAAC L. WILCOX.

REFERENCES CITED

The following references are of record in the file of this patent:

UNITED STATES PATENTS

| Number | Name | Date |
| --- | --- | --- |
| 1,106,005 | Shevlin | Aug. 4, 1914 |
| 1,390,644 | Ritchie | Sept. 13, 1921 |
| 2,275,449 | Magill | Mar. 10, 1942 |
| 2,314,338 | Graves | Mar. 23, 1943 |
| 2,320,764 | Ullrich | June 1, 1943 |
| 2,337,656 | Haycock | Dec. 28, 1943 |
| 2,415,625 | Coker | Feb. 11, 1947 |

FOREIGN PATENTS

| Number | Country | Date |
| --- | --- | --- |
| 492,163 | Great Britain | Sept. 15, 1938 |